April 30, 1935.　　　C. W. GUSTAFSON　　　1,999,964
AIR BRAKE OPERATING DEVICE
Filed Oct. 12, 1932
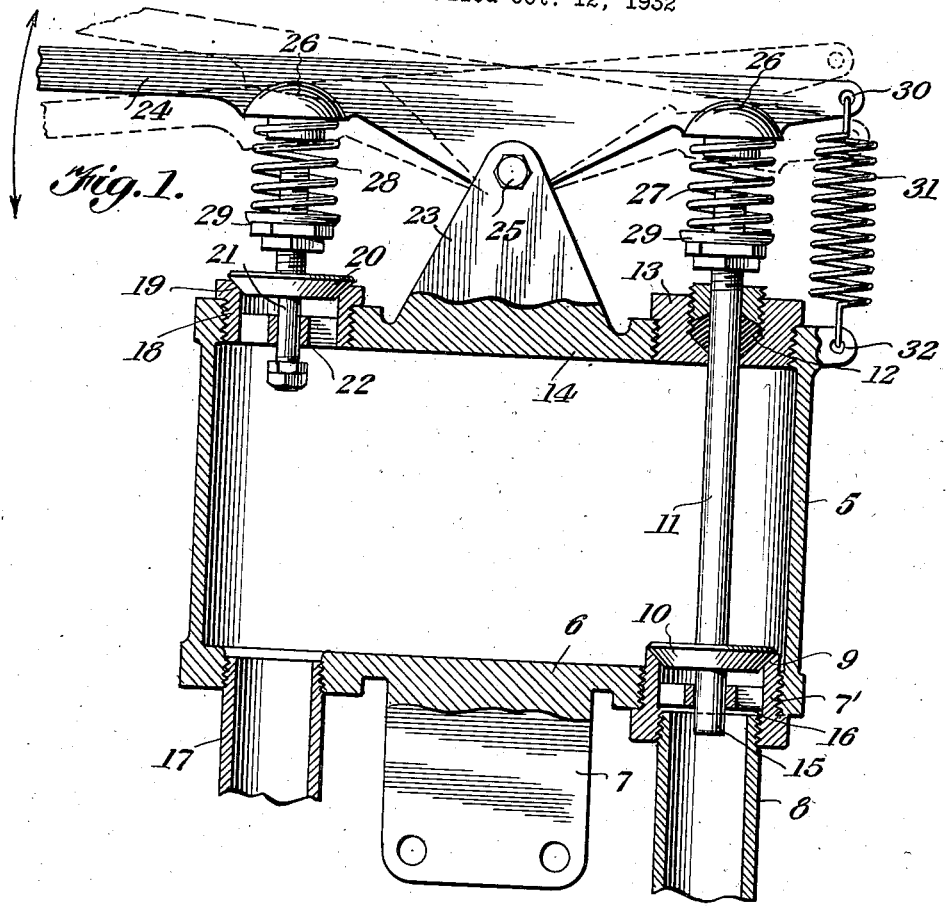
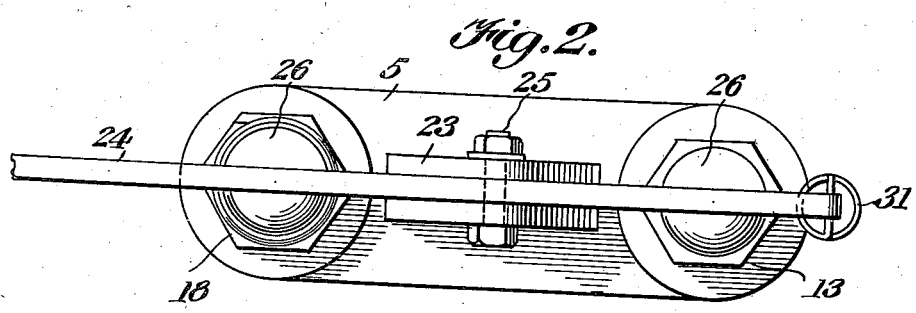
Clarence W. Gustafson
INVENTOR
BY Victor J. Evans & Co.
ATTORNEYS Patented Apr. 30, 1935

1,999,964

UNITED STATES PATENT OFFICE 1,999,964

AIR BRAKE OPERATING DEVICE

Clarence W. Gustafson, White Valley, Mass.

Application October 12, 1932, Serial No. 637,491

1 Claim. (Cl. 303—50)

The invention relates to an air brake operating device and more particularly to an air pressure control for air brake systems for use on motor vehicles, street railways or the like.

The primary object of the invention is the provision of a device of this character wherein, through the use of valves, manually controlled, any amount of pressure on the brakes may be had, so that the device is serviceable to apply, maintain or release the brakes of a vehicle.

Another object of the invention is the provision of a device of this character, wherein the construction thereof is novel in form and the air pressure for the application, maintenance or release of brakes is under positive control and such pressure is delivered to a chamber and through valve arrangement the pressure may be varied either by the rising or falling of the same, the rise or fall following the application of increased or diminished manual force in the control of such valves.

A further object of the invention is the provision of a device of this character which is simple in construction, thoroughly reliable and efficient in its working, positive in action, strong, durable, susceptible for universal use, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a vertical sectional view through the device constructed in accordance with the invention showing by full lines the normal position of the operating lever thereof and by dotted lines the adjustment of said lever for varying the action of the device.

Figure 2 is a top plan view.

Similar reference characters indicate corresponding parts throughout the several views in the drawing.

Referring to the drawing in detail, the device comprises a substantially oval-shaped body 5 preferably made from metal and at its bottom 6 is formed an extension 7 for the mounting of the device stationarily on a support. Fitted in the bottom 6 of the body 5 near one end is a piped nipple 7' into which is tapped the pipe 8 leading from a compressed air tank (not shown). The nipple is formed with a valve seat 9 for a valve 10, the stem 11 of which is slidably fitted in a packing gland 12 carried in a plug 13 threaded into the top 14 of said body 5. This stem 11 is formed with a guide extension 15 slidably fitting in a guide 16 in the nipple 7.

Leading from the body 5 and threaded into the bottom 6 thereof near its other end is a brake cylinder pipe 17 for the lead of the compressed air in the application of brakes of a vehicle.

Fitted in the top 14 of the body 5 is an air outlet nipple 18 having a valve seat 19 for a release valve 20, its stem 21 being fitted in a guide 22 in the nipple 18.

Formed on the top 14 of the body 5 is a forked bearing 23 swingingly supporting an operating lever 24, the same being mounted by a pivot 25 in the forked bearing 23 for rocking movement. The lever 24 at opposite sides of the pivot 25 has formed thereon centering heads 26 for coiled tensioning springs 27 and 28 respectively, these being approximately of the same tension and engaged in adjustable mounts 29 threaded on the stems 11 and 21 of the respective valves 10 and 20.

The lever 24 is formed with an eye extension 30 with which is connected one end of a coiled retractile spring 31, the same being also connected with an eye 32 formed on the body 5. When the lever 24 is in a horizontal neutral position, the springs 27 and 28 are tensioned to maintain the valves 10 and 20 closed, while the spring 31 will maintain a tension upon said lever equal to the pressure of the fluid against the valve 10 so that the said valve will not open until the lever 24 is moved counterclockwise, while the valve 20 will open when the lever is moved clockwise.

In the operation of the device, when the lever 24 at its handle end is depressed the tension of the spring 27 is relieved from the valve 10 against the resistance of spring 31 which valve is normally engaged with the seat 9 so that fluid pressure will be delivered through pipe 8 into the body 5 and thence through pipe 17 to the brake cylinders for the application of the brakes of a vehicle. Now when it is desired to release the brakes the pressure on the handle end of the lever 24 is reduced, thus the handle end will move upwardly so that the spring 27 will become tensioned by the action of spring 31, forcing the valve 10 to its seat 9, thereby shutting off the fluid pressure from pipe 8 into body 5 and at the same time the tension of the spring 28 will be relieved from the relief valve 20, whereupon the fluid pressure will be discharged through the nipple, thus releasing the brakes. The release of the fluid pressure is variable according to the reduction of pressure on the handle end of the lever 24.

The construction of the device permits an operator thereof to apply, maintain or release any amount of pressure on the brakes. When the spring tension on the inlet valve is decreased this valve will open, letting in some air into the body of the device. When the pressure in the valve chamber of said body plus the tension of the spring equal the pressure in the tank this inlet valve will close. When the tension on the inlet valve spring is decreased the tension on the release valve spring is increased. To release some air the lever will have an upward movement, decreasing the tension on the release valve spring and thus allowing any amount of air desired to escape to the atmosphere from the body of said device.

What is claimed is:

An air brake operating device comprising a body forming a chamber having openings in its top and bottom and disposed diagonally opposite each other, valve seat nipples fitted in said openings, a compressed air supply pipe connected with the nipple in the bottom opening, a brake cylinder pipe communicating with the chamber through the bottom of the body, valves slidably fitted with the nipples and adapted for seating therein, a bearing rising from the top of the body, a rocking lever pivoted to said bearing and having spring seats at opposite sides of the bearing, stems on said valves, adjustable spring seats on the stems, springs interposed between the spring seats, and a coiled retractile spring having connection with said lever and said body and disposed adjacent to the stem of the valve controlling the compressed air supply pipe.

CLARENCE W. GUSTAFSON.